(12) United States Patent
Kessler

(10) Patent No.: US 9,141,446 B2
(45) Date of Patent: Sep. 22, 2015

(54) MAINTENANCE OF MESSAGE SERIALIZATION IN MULTI-QUEUE MESSAGING ENVIRONMENTS

(75) Inventor: Joerg Kessler, Nussloch (DE)

(73) Assignee: SAP SE, Walldorf (DE)

( * ) Notice: Subject to any disclaimer, the term of this patent is extended or adjusted under 35 U.S.C. 154(b) by 1436 days.

(21) Appl. No.: 12/258,379

(22) Filed: Oct. 24, 2008

(65) Prior Publication Data

US 2010/0107176 A1    Apr. 29, 2010

(51) Int. Cl.
*G06F 9/54* (2006.01)

(52) U.S. Cl.
CPC .......... *G06F 9/546* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 4,630,254 A * | 12/1986 | Tseng | 398/61 |
| 5,729,540 A * | 3/1998 | Wegrzyn | 370/336 |
| 5,887,135 A * | 3/1999 | Dahlen et al. | 709/250 |
| 5,916,307 A * | 6/1999 | Piskiel et al. | 719/314 |
| 5,978,359 A * | 11/1999 | Caldara et al. | 370/236 |
| 6,091,709 A * | 7/2000 | Harrison et al. | 370/235 |
| 6,246,691 B1 * | 6/2001 | Briem et al. | 370/412 |
| 6,393,532 B1 * | 5/2002 | Takada et al. | 711/154 |
| 6,477,144 B1 * | 11/2002 | Morris et al. | 370/230.1 |
| 6,654,343 B1 * | 11/2003 | Brandis et al. | 370/229 |
| 6,658,485 B1 * | 12/2003 | Baber et al. | 719/314 |
| 6,832,279 B1 | 12/2004 | Potter et al. | |
| 6,862,595 B1 * | 3/2005 | Elko et al. | 1/1 |
| 7,164,678 B2 | 1/2007 | Connor | |
| 7,349,398 B1 | 3/2008 | Favor et al. | |
| 7,746,783 B1 * | 6/2010 | Tripathi et al. | 370/235 |
| 8,046,780 B1 * | 10/2011 | Alcock et al. | 719/330 |
| 2002/0052978 A1 * | 5/2002 | Stall | 709/313 |
| 2002/0099915 A1 * | 7/2002 | Takada et al. | 711/154 |
| 2003/0014551 A1 * | 1/2003 | Ishibashi et al. | 709/310 |
| 2003/0016685 A1 * | 1/2003 | Berggreen | 370/412 |
| 2003/0076849 A1 * | 4/2003 | Morgan et al. | 370/412 |
| 2003/0135639 A1 * | 7/2003 | Marejka et al. | 709/232 |
| 2003/0158992 A1 * | 8/2003 | Ajanovic et al. | 710/305 |
| 2003/0172104 A1 * | 9/2003 | Hooman et al. | 709/103 |
| 2003/0182464 A1 * | 9/2003 | Hamilton et al. | 709/314 |
| 2003/0231647 A1 * | 12/2003 | Petrovykh | 370/429 |
| 2004/0015973 A1 * | 1/2004 | Skovira | 718/103 |
| 2004/0076161 A1 * | 4/2004 | Lavian et al. | 370/395.41 |
| 2004/0133680 A1 * | 7/2004 | Sorrentino et al. | 709/226 |
| 2004/0151114 A1 * | 8/2004 | Ruutu | 370/230 |
| 2004/0170195 A1 * | 9/2004 | Slivkoff et al. | 370/474 |
| 2004/0199810 A1 * | 10/2004 | Tarcea et al. | 714/6 |

(Continued)

*Primary Examiner* — Shih-Wei Kraft
(74) *Attorney, Agent, or Firm* — Brake Hughes Bellermann LLP

(57) ABSTRACT

Messages may be provided to a source queue in serialized order, each message associated with a serialization context. The messages may be buffered in the source queue until a transmission time is reached, in turn, for each buffered message. Transmission-ready messages may be sent from the source queue according to the serialized order, using the serialization context, while continuing to store existing messages that are not yet transmission-ready. A queue assignment of the serialization context may be changed to a target queue. Subsequent messages may be provided with the serialization context to the target queue for buffering therein, while remaining transmission-ready messages may be continued to be sent from the source queue. The existing messages from the source queue associated with the serialization context may be determined to have been sent, and the subsequent messages may be sent from the target queue in serialized order, using the serialization context.

16 Claims, 5 Drawing Sheets

(56) References Cited

U.S. PATENT DOCUMENTS

| | | |
|---|---|---|
| 2005/0021567 A1* | 1/2005 | Holenstein et al. ........... 707/200 |
| 2005/0089053 A1* | 4/2005 | Zhu ............................... 370/412 |
| 2005/0155041 A1* | 7/2005 | Dinh et al. .................... 719/314 |
| 2005/0235058 A1* | 10/2005 | Rackus et al. ................ 709/224 |
| 2005/0240625 A1* | 10/2005 | Chang et al. ............... 707/104.1 |
| 2006/0034167 A1* | 2/2006 | Grice et al. ................... 370/229 |
| 2006/0241996 A1* | 10/2006 | Burger et al. ..................... 705/9 |
| 2007/0047538 A1* | 3/2007 | Rosner et al. ................. 370/379 |
| 2007/0073821 A1* | 3/2007 | Brail ............................. 709/206 |
| 2007/0104102 A1* | 5/2007 | Opsasnick .................... 370/230 |
| 2007/0118601 A1* | 5/2007 | Pacheco ....................... 709/206 |
| 2008/0170571 A1* | 7/2008 | Kumar et al. ................. 370/392 |
| 2008/0275989 A1* | 11/2008 | Ebersole et al. .............. 709/225 |

* cited by examiner

MAINTENANCE OF MESSAGE SERIALIZATION IN MULTI-QUEUE MESSAGING ENVIRONMENTS

TECHNICAL FIELD

This description relates to messaging.

BACKGROUND

Many software applications are used to exchange messages with one another in order, for example, to enable or facilitate a function of the software application(s). For example, such message exchanges may occur within and among many types of business software applications, such as Customer Resource Management (CRM) applications, Enterprise Resource Planning (ERP) applications, and/or Supply Chain Management (SCM) applications.

In many cases, it may occur that such message exchanges are asynchronous, yet related messages sent by one of the applications must be maintained in a pre-determined order, such as a serialized or serial order. For example, again in the specific example of a business application, it may occur that an order is received from a customer to purchase a product. Messages may then be sent by the related business application related to, among other topics, receipt of payment, inventory processing, and shipment processing. In this example, messages sent/received that are related to payment receipt must be ordered ahead of the other messages, so that exceptions do not occur such as starting the inventory or shipping processes only to find after the fact that payment has not been, or will not be, received.

Maintaining such order in the context of a single set of messages associated with a single application and single messaging environment may be straight-forward. For example, if a set of such serial messages are processed through a single queue or buffer, then the messages may simply be processed on a first-in-first-out (FIFO) order.

In practice, however, complications and difficulties may arise. For example, it may occur that multiple sets of serialized messages are to be processed within a corresponding multiplicity of queues and queue environments (e.g., on different computing devices), such as when (in the example above) a new queue is established for each new customer order. Moreover, it may be desirable to alter a processing of the messages to obtain a desired result, such as faster processing time or improved queue organization. In such cases, it may be difficult to obtain the desired result while also maintaining the desired order of the various serialized messages.

SUMMARY

According to one general aspect, a computer system may include a queue assignment handler configured to associate a serialization context with a source queue used to transmit messages, and configured to receive a change in queue assignment of the serialization context from the source queue to a target queue. The computer system also may include a queue monitor configured to monitor messages associated with the source queue and the target queue, and a queue scheduler configured to execute the change in queue assignment. The queue scheduler may be configured to determine, from the queue assignment handler, the change in queue assignment of the serialization context to the target queue, suspend transmission of existing messages from the source queue and the target queue, and disable a placement of subsequent messages into the source queue, schedule placement of the subsequent messages within the target queue, resume transmission of the existing messages from the source queue, and receive, from the queue monitor, notification of completion of the transmission of the existing messages from the source queue.

According to another general aspect, a computer program product may be tangibly embodied on a computer-readable medium and may include executable code that, when executed, may be configured to cause a data processing apparatus to determine a change in assignment of a serialization context from a source queue to a target queue, the serialization context being associated with messages and being used to maintain a serial order of the messages during transmission thereof, and initiate a transition period in which the serialization context is associated with both the source queue and the target queue, and in which a first subset of the messages in the serial order are present in the source queue and a second subset of the messages in the serial order are present in the target queue. The executable code, when executed, also may be configured to cause a data processing apparatus to transmit, during the transition period, all of the first subset of messages until the source queue is empty of the first subset of messages, and terminate the transition period including associating the serialization context exclusively with the target queue and beginning transmission of the second subset of messages in the serial order from the target queue.

According to another general aspect, a method may include providing messages to a source queue in serialized order, each message associated with a serialization context, buffering the messages in the source queue until a transmission time is reached, in turn, for each buffered message, sending transmission-ready messages from the source queue according to the serialized order, using the serialization context, while continuing to store existing messages that are not yet transmission-ready, changing a queue assignment of the serialization context to a target queue, providing subsequent messages with the serialization context to the target queue for buffering therein, while continuing to send remaining transmission-ready messages from the source queue, determining that all of the existing messages from the source queue associated with the serialization context have been sent, and beginning to send the subsequent messages from the target queue in serialized order, using the serialization context.

The details of one or more implementations are set forth in the accompanying drawings and the description below. Other features will be apparent from the description and drawings, and from the claims.

DETAILED DESCRIPTION

Figure 1:
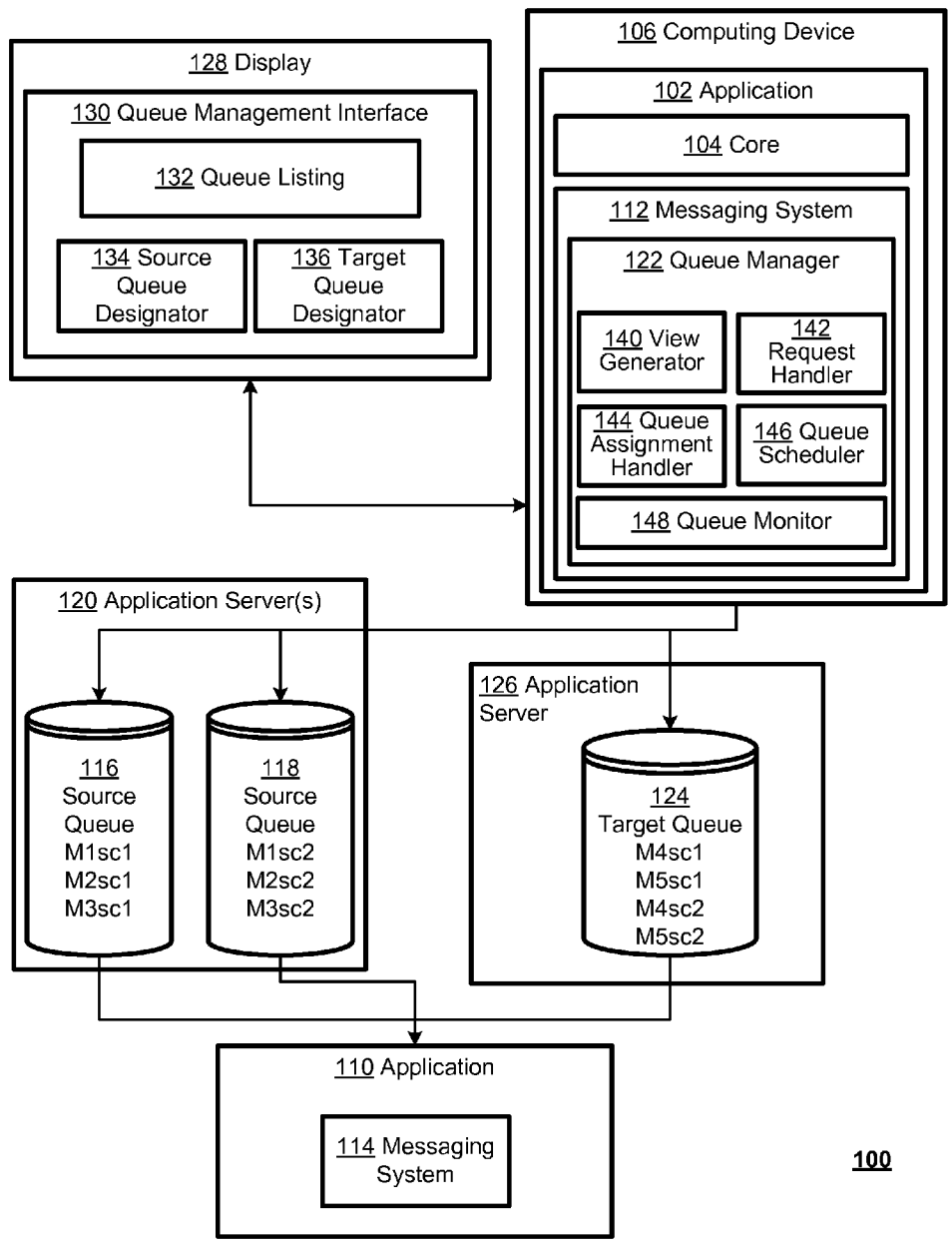
FIG. 1 is a block diagram of a system for maintaining message serialization in a multi-queue messaging environment.

FIG. 1 is a block diagram of a system 100 for maintaining message serialization in a multi-queue messaging environment. That is, in the example of FIG. 1, the message serialization is maintained even when the processing of a stream or set of serialized messages is handled by multiple queues over a period of time. In this way, for example, advantages may be obtained such as reduced/improved message processing time through batch-processing of multiple, selected message queues. Other features and advantages will be apparent from the below description.

In FIG. 1, an application 102 represents virtually any software application that may be used to send messages, such as asynchronous serialized messages. Examples of such applications include CRM, ERP, and SCM applications, as referenced herein. The application 102 is illustrated as including core 104 that relates to the functionality of the application 102. For example, the core 104 may relate to managing interactions with customers if the application 102 is a CRM application, or may relate to ordering/processing/shipping inventory if the application 102 includes a SCM application.

As shown, the application 102 may be executed on a computing device 106 or other data processing apparatus. It may be appreciated that the computing device 106 may include virtually any computing device capable of executing the application 102, and may be understood to include standard elements, such as, for example, a processor and a memory, so that computer-readable instructions for executing the application and components thereof may be stored on the memory or other computer-readable storage medium, and may be read by the processor in order to cause the computing device 106 or other data processing apparatus to perform the functions described herein, as well as other related functions not specifically set forth. Further, although illustrated as a single computing device, it may be appreciated that the computing device 106 may represent or be associated with multiple computing devices, such as a plurality of application servers as set forth herein.

In operation, the application 102 may send messages to an application 110, which may be of the same or different type than the application 102. Specifically, the application 102 may include a messaging system 112 that is assigned the responsibility of exchanging messages with a corresponding messaging system 114 of the application 110, as shown. Of course, the application 110 is merely representative, and in fact the messaging system 112 and associated components may be used to exchange messages with a large number of other applications/messaging systems.

In some example implementations, the messaging systems 112, 114 may be implemented as integral parts of their respective applications 102, 110. In other example implementations, the messaging systems 112, 114 may represent more-or-less discrete components that may be used and/or adapted as-needed by multiple types of applications. In any case, by including the messaging systems 112, 114 within the applications 102, 110, the responsibility for managing the messages, including maintaining the serialized order thereof, may be delegated to the messaging systems 112, 114.

Specifically, during operation, the application core 104 may generate messages and, in so doing, may generate associated serialization contexts, as well. The serialization context(s) thus provides a mechanism to ensure that dependent or otherwise related messages are maintained and transmitted in serial order, such that, for example, later-generated messages are not erroneously transmitted prior to earlier-generated messages. In this way, the serialization context may provide information that ensures that an order of transmission of the messages matches an order of generation of the messages.

For example, if the application core 104 generates a set of messages related to a customer order, as in the example above, then all such messages are required to be maintained in serial order may be associated with a serialization context that signifies this requirement. In this example, the serialization context may be implemented as an order number that correlates the messages with the order. In other examples, such as when the application 102 is a CRM application, specific customer information may be used as the serialization context to maintain order of all messages related to a particular customer (e.g., within a given time frame). Thus, the serialization context may be a single number or other identifier, or may be a number(s) or identifier(s) derived from a combination of factors (e.g., a combination of order number, customer ID, and relevant time frame). The serialization context may include the relevant identifier(s) as well as a time of generation (or other timing information) of each message, for use in ordering the messages.

Thus, such a serialization context may be understood to include at least an identifier that may be included with each group of messages that is to be maintained in serial order. That is, considering that the application core 104 may generate a large number of messages that may be related to varying extents, the application core 104 may also be responsible for determining which groups of such messages must be maintained in serial order. There may be various technical criteria for making such determinations, such as, for example, evaluating common factors (if any) among a given group of messages (e.g., as just described, such a common factor may include being related to a single order, or to a single customer). The application core 104 may further compare these common factors against pre-determined factors to determine whether and how serialization should be maintained. For example, in some cases, the application core 104 may select information related to the common factor(s) for assigning as the serialization context (e.g., the order number). In other cases, the application core 104 may assign the serialization context(s) according to a pre-determined scheme (e.g., a pre-determined assignment of alpha-numeric identifiers). As also referenced, the serialization context may be as simple as a single identifier, or may include more detailed information about whether, how, and to what extent serialization should be maintained. For example, time stamps of the messages may be used as part of the serialization context, or may be used to define or implement the serialization context. In a specific example, it may occur that a time window is defined in which all messages meeting a certain criteria are assigned the same serialization context, and are thereafter assigned a different serialization context, or are no longer serialized.

In the example of FIG. 1, each serialization context, and thus, all associated messages with the serialization context, may be assigned to at least one queue for transmission therefrom to the messaging system 114. Such queues may be used for conventional reasons and advantages, such as buffering of the messages, or for sending the messages as transmission resources become available (e.g., network resources).

In FIG. 1, then, a queue 116 is illustrated that is assigned "serialization context 1." In FIG. 1, messages are designated as "Mn," while serialization contexts are represented as "scn." Thus, queue 116 contains three messages, each associated with serialization context 1 and thus represented as M1sc1, M2sc1, and M3sc1, as shown. It will be appreciated that these messages may be maintained in their serial order for transmission to the messaging system 114. Similarly, a queue 118 may be assigned a serialization context of "sc2," and may thus similarly include messages M1sc2, M2sc2, and M3sc2, as shown. As also shown, the queues 116, 118 may run on an application server 120, which may be the same as (e.g., may execute the application 102), or in communication with, the computing device 106.

In FIG. 1, for simplicity, only the two queues 116, 118 are illustrated in the application server 120. However, in practice, there may be tens, hundreds, or thousands of queues, e.g., a queue corresponding to each of a number of orders placed using the application 102. In any case, as may be appreciated from FIG. 1, each queue may have its own unique name and/or identifier, and may be assigned at least one serialization context. That is, in FIG. 1, each queue 116, 118 has a single serialization context of sc1 and sc2, respectively. However, it may be possible to have both serialization contexts sc1 and sc2 assigned to the same queue, or, more generally, multiple queues may each be assigned multiple serialization contexts. It may be appreciated that suitable naming conventions may be used to name each queue 116, 118 in a unique but recognizable manner, and that each queue name may be assigned the corresponding serialization context. Thus, as described, all messages having this serialization context may be assigned to the corresponding queue with the same serialization context.

Over time, processing of the queues 116, 118 may be, or become, sub-optimal. For example, the messaging system 112 may include a queue manager 122 that is responsible for scheduling messages to be sent to, and transmitted from, each queue. When a number of queues is large, the processing required of the queue manager 122 to manage all of the queues may become excessive, resulting in a slowed operation of the system 100 as a whole, e.g., resulting in delays in receiving the messages at the application 110. In other examples, and conversely, it may occur that too many serialization contexts are assigned to a single queue, resulting in potential confusion (e.g., of a human user of the system 100) as to how to manage the various queues. Somewhat similarly, a human user may simply wish to reorganize a structure, naming convention, or other use of the queues.

In these and similar situations, it may be useful to change an assignment of one or more serialization contexts from a first queue to a second queue (or to otherwise change a number of serialization contexts assigned to a given queue), so as to gain the desired advantages of, e.g., faster processing time or improved organization of message processing. In FIG. 1, an example is illustrated in which the queues 116, 118 are shown as source queues which initially are associated with their respective serialization contexts sc1 and sc2, and a queue 124 is illustrated as a target queue to which both of the serialization contexts may be reassigned.

In FIG. 1, a display 128, such as a monitor or other computer display, may be used to provide a graphical user interface (GUI) such as a queue management interface 130. The interface 130 may be used to conduct the changes in assignment of serialization context as described herein. For example, as shown, the interface 130 may include a queue listing 132 of available or potential queues, which a user may take advantage of to determine an existence and use of the various queues. The interface 130 also may provide a source queue designator 134 and a target queue designator 136, which a user may utilize to designate source and target queues, respectively. Although illustrated as separate components of the interface 130, representing one example implementation(s), it may occur that elements 132, 134, 136 are integral, such as if the queue listing 132 provides a listing of all queues and the user may click on desired queues listed there for designation as a source queue or target queue.

In other implementations, changes in assignment of serialization contexts between queues as described herein may occur automatically, e.g., in response to a pre-designated condition coming into existence (such as a certain number of queues), or after a pre-determined amount of time has passed. In such examples, the interface 130 may be used to set the conditions (e.g., precipitating events) that initiate the processing, As referenced above, the source queues 116, 118 are representative of potentially hundreds or more source queues, where the serialization contexts of all such queues may be consolidated into a single assignment thereof to the target queue 124. For example, the source queues 116, 118 may accumulate over time, as a new queue may be generated whenever a new order or other impetus occurs. Over time, however, the resulting number of queues may become unwieldy, and processing of the queues may become overly burdensome and lengthy. By consolidating contents of the queues for batch processing a single (or at least, fewer) queues, processing demands may be mitigated substantially. More generally, multiple target queues also may be used, such as when, for example, 1000 source queues have serialization contexts that are consolidated into ten target queues of 100 serialization contexts each, or some other variation/combination of a plurality/multiplicity of source and target queues.

In these and other scenarios where assignment(s) of serialization context(s) are changed within and among a plurality of queues, it may easily occur that the assignment changes may result in a loss of serialization of the messages, e.g., messages being delivered out of order. For example, if messages M1sc1, M2sc1, M3sc1 are sent to the source queue 116 and buffered there for transmission, and then a queue assignment of serialization context sc1 is changed to correspond to the target queue 124, it may occur that messages M4sc1 and/or M5sc1 are sent to the target queue 124 and then transmitted therefrom prior to transmission of one or more of the messages M1sc1, M2sc1, or M3s1. That is, a serialization of messages M1sc1 through M5sc1 may be lost during the change in serialization context assignment between queues. Therefore, in the example of FIG. 1, the queue manager 122 may include a number of components and functionalities associated with altering assignments of serialization contexts within and among one or more of a plurality of queues, while at the same time ensuring maintenance of the serialization/order of messages having the same serialization context.

For example, the queue manager 122 may include a view generator 140 configured to provide the queue management interface 130, as well as an associated request handler 142 configured to receive inputs from the interface 130 for providing to other components of the queue manager 122. Further, a queue assignment handler 144 may receive a change in assignment of one or more serialization contexts (and associated messages) between and among one or more queues, e.g., from the request handler 142, and may alert a queue scheduler 146 to schedule messages to and from the relevant queues in the manner described herein so as to maintain serialization thereof during a transition period from the original queue assignment to the new queue assignment. The queue scheduler 146 may be assisted in this task by a queue monitor 148, which may be configured, for example, to monitor at least each of the source queues as described herein so as to provide the queue scheduler 146 with information useful in maintaining the serialization of the relevant messages.

Detailed examples of the operation of the queue manager 122 are provided herein. In general, though, it may be appreciated that during an example operation it may occur that source queues 116, 118 may be in the process of transmitting messages having serialization contexts sc1 and sc2, respectively, as shown. Upon occurrence of an initiating event, such as a request from the interface 130, the queue assignment handler 144 may determine to change the assignment of the serialization contexts sc1 and sc2 to a new queue, e.g., to the target queue 124. Thereafter, subsequent messages with those serialization contexts may all be assigned to the target queue 124 and stored/buffered there by the queue scheduler.

Thus, it may be seen that such a change in queue assignment effectively initiates a transition period in which new messages are being assigned to the new, target queue 124, while existing messages that are/were not yet transmission ready are still present within the old, source queues 116, 118. Eventually, once all of the existing messages are sent from the source queues 116, 118 (e.g., as determined by the queue monitor 148), then the transition period ends and transmission of the relevant messages may proceed normally (e.g., in serialized order) with respect to the target queue 124. In the meantime, however, while messages with the same serialization context exist in two or more queues simultaneously, a danger potentially exists that the serialization/order of the messages may be violated by the transmission of a later/subsequent message in the target queue 124 prior to transmission of an earlier/existing message from the source queue(s) 116, 118.

The queue manager 122 avoids this result and maintains message serialization by suspending transmission of messages having a certain serialization context from the target queue 124 until no messages with the same serialization context exist in any other queue (e.g., as determined by the queue monitor 148). In FIG. 1, for example, the queue monitor 148 may determine that all messages M1sc1, M2sc1, and M3sc1 have been transmitted from the source queue 116, so that the queue scheduler 146 may then initiate transmission of new/subsequent messages M4sc1 and M5sc1 from the target queue 124. In the meantime, if at least message M3sc2 has not been sent from the source queue 118, then the queue scheduler 146 may continue suspending new/subsequent messages M4sc2 and M5sc2 having serialization context sc2, so as to avoid transmitting those messages out of order.

As may be seen, then, the queue manager 122 may be used to alter (e.g., raise or lower) a number of serialization contexts assigned to a given queue, and, in so doing, to conduct a transition period in which messages with the same serialization context exist in multiple queues at the same time. Thus, the queue manager 122 may create a temporary dependency between otherwise independent or unrelated queues during the transition period, where the dependency is used to maintain serialization of all messages having the same serialization context, regardless of which queue is used to transmit the messages during the transition period. Once the transition period is over, e.g., when all existing messages from the source queue(s) 116, 118 are transmitted, then the queue manager 122 may break the dependency of the source/target queues (e.g., by deleting the source queue(s) 116, 118 if they are completely empty), whereupon the transition period may be ended and the target queue 124 may continue transmitting subsequent messages of each relevant serialization context in serialized order and in a conventional fashion.

In so doing, in this example(s), the various messages may thereafter be processed more quickly and more efficiently from, e.g., the single target queue 124 than from the multiple queues 116, 118. Thus, on the whole, a processing time and burden of the system 100 may be reduced. In this regard, and as described in more detail herein, it may be appreciated that the described changes in assignments of serialization contexts between queues and associated processing may introduce its own delay in transmitting some of the messages. For example, during the transition period, transmission of some messages may be temporarily suspended that otherwise may have occurred in the relevant time period. Such delays may be quantified and compared to an overall time/processing savings that is obtained with the use of the queue manager 122, to ensure that a net savings is obtained.

For example, if transmission of messages of serialization context sc1 is almost completed from source queue 116, then it may not be worthwhile to change an assignment of the serialization context sc1 (e.g., message transmission might be completed before the assignment change and associated operations could be). Thus, in some examples, the queue assignment handler 144 may be configured to optimize the savings in time and processing, by, for example, examining the various queues and selecting queues for consolidation/alteration of serialization context assignments that are most likely to result in maximum savings.

For example, the queue assignment handler 144 may suggest potential source queues to the user via the queue listing 132 of the interface 130, or may proceed automatically to use optimal sets of the potential source queues. For example, in the batching processes just described, the queue assignment handler 144 may communicate with the application core 104 and/or the queue monitor 148 to determine potential source queues (and associated serialization contexts) having the largest number of existing and/or future messages, or having the longest processing delay(s), on the assumption that such queues will be most worthwhile in terms of the investment of time and resources to conduct the changes in assignment of serialization context(s), as described herein.

Additional and alternative features and advantages of the system 100 are provided herein, or would be apparent to one of ordinary skill in the art. In particular, it may be appreciated that certain features and advantages may be related to conventional elements of the application or messaging system 112 that are not specifically illustrated in FIG. 1 for the sake of clarity and conciseness. For example, the messaging system 112 may or may not include a number of conventional components, such as message handlers, message logs, and other components associated with core messaging functions. Such components may interact with, include, or be associated with the illustrative components of the queue manager 122 of FIG. 1, as would be apparent.

Figure 2:
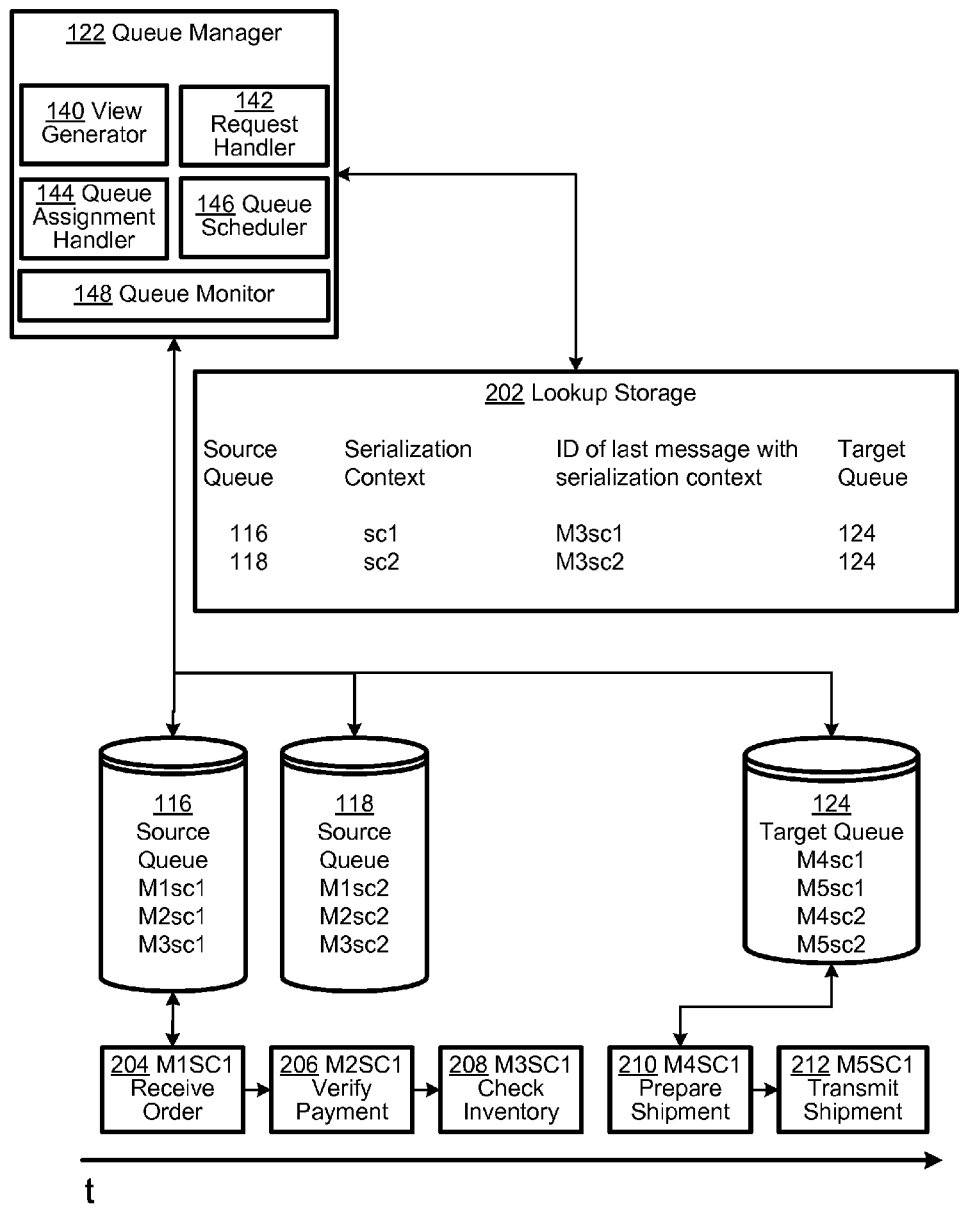
FIG. 2 is a block diagram of an example implementation of the system of FIG. 1.

FIG. 2 is a block diagram of an example implementation of the system of FIG. 1. In FIG. 2, example operations of the system 100 of FIG. 1 are illustrated with reference to a specific implementation(s) and related example scenario(s). In particular, a lookup storage 202 is illustrated that may be used to optimize the change in queue assignment described above, e.g., used to minimize the transition period in which one serialization context is associated with multiple queues. Further, example messages 204-212 are illustrated which provide specific examples of serialized messages that may be sent using the system 100 of FIG. 1. As described above with respect to FIG. 1, it may be ensured that messages of the source queue(s) 116, 118 are processed before messages of the target queue 124 having the same serialization context.

Specifically, in FIG. 2, messages 204, 206, 208 correspond to messages M1sc1, M2sc1, and M3sc1 as contained within the source queue 116 at a time "t." In FIG. 2, the message 204 relates to receiving an order (e.g., for a product), while message 206 relates to verifying payment, and message 208 relates to checking inventory for the ordered product.

In the example of FIG. 2, as above in FIG. 1, it may occur that the assignment of the serialization context 1 (sc1) is changed from source queue 116 to target queue 124, thus initiating the transition period in which sc1 is associated with both queues 116, 124. In this case, as referenced above and described in detail below, the queues 116, 124 may be stopped and started as needed to maintain serialization of all messages related to serialization context sc1.

For example, transmissions of the source queue 116 and the target queue 124 may be stopped (or never started if the target queue 124 newly-created), and any new/subsequent messages such as a message 210 (corresponding to message M4sc1) and message 212 (corresponding to message M5sc1) may be assigned to and stored in the target queue 124. At this point, it is apparent that the contents of the source queue 116 are static, at least with respect to messages having serialization context sc1. When the queue scheduler 146 resumes transmission of existing messages from the source queue 116, it is apparent that (since no new messages are being added) the number of messages with serialization context sc1 in the source queue 116 will decrease to zero. Similar comments all apply to messages M1sc2, M2sc2, M3sc2 of the source queue 118, where the serialization context sc2 also may experience a change in queue assignment to the target queue 124, as shown.

While the contents of the source queues 116, 118 are static, the lookup storage 202 may be created in order to speed the processing of the change in queue assignment of the serialization contexts sc1, sc2, i.e., to reduce the period referenced herein as the transition period in which each of the serialization contexts sc1, sc2 are associated with both of a source queue and target queue (e.g., sc1 being associated with both queues 116, 124).

Specifically, as shown, for each source queue the lookup storage 202 may store an associated serialization context (the queue assignment of which is being changed), a message identifier (ID) of a last message having the relevant serialization context within the relevant source queue, and an identification of the related target queue to which the queue assignment is being changed. For example, a message ID (M3sc1) for the message 204 (which is the last relevant message stored in the source queue 116) may be stored in association with the source queue 116, the serialization context sc1, and the target queue 124. Similarly, a message ID (M3sc2) for the corresponding message (which is the last relevant message stored in the source queue 118) may be stored in association with the source queue 118, the serialization context sc2, and the target queue 124.

The queue monitor 148 may be used to create the lookup storage 202, and then may simply monitor the lookup storage 202 rather than the queue(s) 116, 118 themselves. In general, the queue monitor may be enabled to monitor a queue and access the serialization context, each message identifier, and an order of each message in the queue. Thus, as just referenced, the queue monitor 148 has the information necessary to create the lookup storage 202.

Then, during operation of the queue scheduler 146 to execute the change in queue assignment, e.g., of the serialization context sc1, the queue monitor 148 may access the lookup storage 202 whenever a message is transmitted from the source queue 116 during the transition period. When the message ID of the transmitted message matches that of the message ID stored in the lookup storage 202, the queue monitor 148 becomes aware that the source queue 116 is now empty of messages having the serialization context sc1. Consequently, the queue monitor 148 may so notify the queue scheduler 146, which may then initiate ending of the transition period and transmission of the relevant subsequent messages (e.g., messages 210 (M4sc1) and 212 (M5sc1)) that have been accumulating in the target queue 124 in the meantime during the transition period and that have the same serialization context sc1.

Of course, in the situation in which multiple serialization contexts sc1, sc2 are being consolidated to the target queue 124, the queue monitor 148 may monitor all source queues (e.g., both of queues 116, 118) and may notify the queue scheduler 146 to initiate an ending of the transition period and beginning of transmissions of the relevant subsequent messages for each source queue/serialization context. When the lookup storage 202 is empty, then the change in queue assignment is complete for each (or all) serialization contexts.

It may be appreciated that the term transition period may be used in an alternate or overlapping fashion, depending on a number of source and target queues during a particular change in queue assignment(s). For example, for a single pair of source/target queues, there may be a transition period during which the single relevant serialization context (e.g., sc1) is associated with both the source/target queues 116/124, and this transition period ends approximately when all existing messages with that serialization context have been sent from the source queue, and new message can begin to be sent from the target queue 124. More generally, as may be appreciated, there may be two, tens, hundreds, thousands, or more source queues, e.g., to be consolidated into the target queue 124. In these and other cases, the term transition period may refer to an overall transition period during which any (combination) of the relevant serialization contexts of the source queues remain associated with at least two (source/target) queues. In this case, the transition period may be considered to end when the last of the relevant message IDs have been read from the lookup storage, whereupon the lookup storage is empty and may be cleared and/or deleted.

In other implementations, the lookup storage 202 may store all of the static messages in a given source queue (such as the source queue 116). Then, the queue monitor 148 may detect that (relevant portions of) the table is/are empty in order to initiate an end of the transition period and beginning of transmission of messages from the target queue 124. Of course, the lookup storage 202 is optional, and a user may omit it and execute the change in serialization context assignment simply by checking the relevant queue(s) 116, 118 directly to determine when these queues are empty.

Once the queue monitor 148 determines, e.g., using the lookup storage 202 that one or more of the source queues 116, 118 is empty of messages having the serialization contexts sc1, sc2, respectively, then the queue scheduler 146 may disable the source queues in question and enable the target queue, e.g. the target queue 124. Then, messages from the target queue 124 may commence being sent, such as the messages 210, 212, without violating the serialization conditions of their related messages 204, 2006, 208. I this way, as already explained, it is possible to ensure that messages are not received out of order, and to avoid a situation where, for example, the message 210 of preparing a shipment is received before a message of 206 related to verifying a payment.

Figure 3:
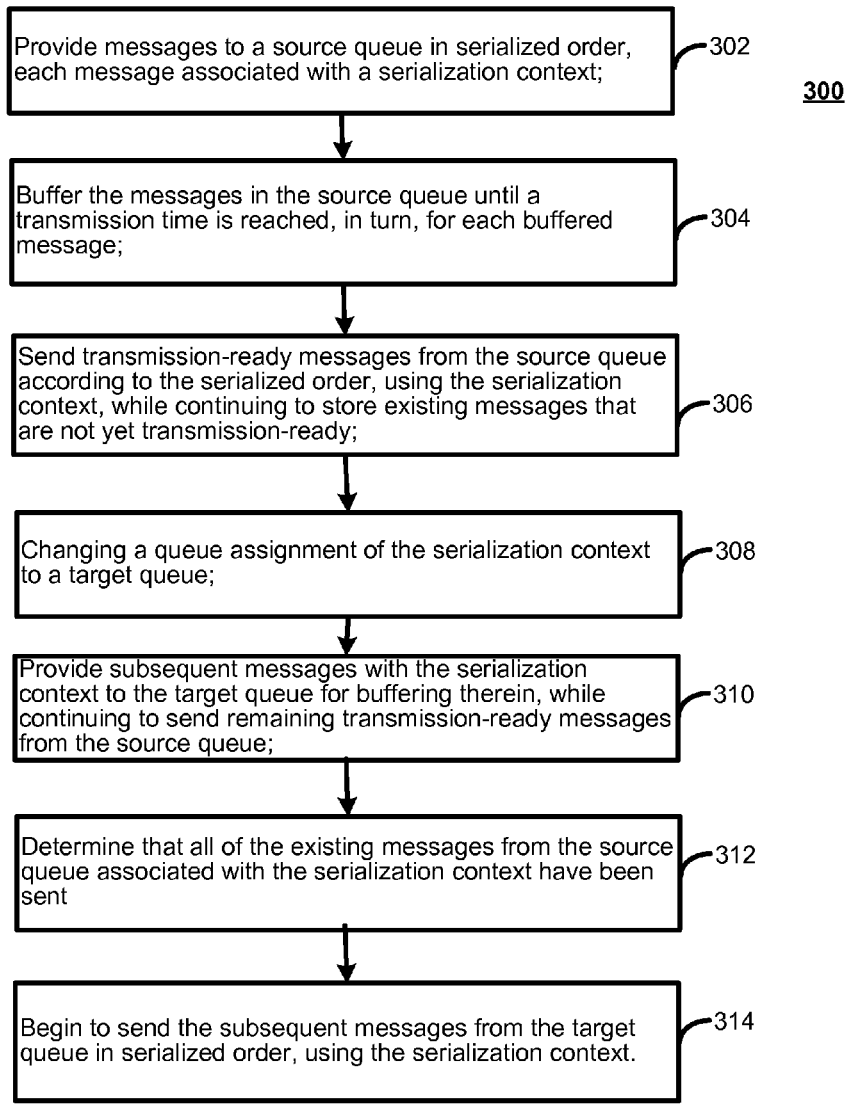
FIG. 3 is a flowchart illustrating example operations of the system(s) of FIGS. 1 and 2.

FIG. 3 is a flowchart 300 illustrating example operations of the system(s) of FIGS. 1 and 2. In the example of FIG. 3, messages may be provided to a source queue in serialized order, each message associated with a serialization context (302). For example, the queue scheduler 146 may initially be responsible for scheduling messages from the source queue 116, such as messages 204-208 that may be associated with an order received via the application 102, where the serialization context thereof may be determined from an identifier associated with the order.

The messages may be buffered in the source queue until a transmission time is reached, in turn, for each buffered message (304). For example, the queue scheduler 146 may buffer some or all of messages 204-208 in the source queue 116 until such a transmission time is reached.

Transmission-ready messages may be sent from the source queue according to the serialized order, using the serialization context, existing messages that are not yet transmission-ready may continue to be stored (306). For example, the queue scheduler may send the message 204 if it is transmission ready (e.g., all messages before it have already been sent), while continuing to store existing messages such as the messages 206, 208.

A queue assignment of the serialization context may be changed to a target queue (308). For example, the request handler 142 may receive from the queue management interface 130 a designation of the source queue 116 (and 118) as such, as well as a designation of the target queue 124 as such, along with a change in assignment of the serialization contexts sc1 and sc2 to the target queue 124. The request handler 142 may forward this information to the queue assignment handler 144 for executing the actual assignment change. In other implementations, such a change in queue assignment of the serialization context may occur periodically as executed by the queue assignment handler, e.g., as an optimization of processing time by consolidating multiple queue assignments of multiple serialization contexts into association with the target queue 124.

Subsequent messages with the serialization context may be provided to the target queue for buffering therein, while remaining transmission-ready messages are sent from the source queue (310). For example, the queue scheduler 146 may provide subsequent messages 210, 212 to the target queue 124, while sending remaining transmission-ready messages 206, 208 from the source queue 116.

It may be determined that all of the existing messages from the source queue associated with the serialization context have been sent (312). For example, the queue monitor 148 may monitor the source queue 116 and determine that the last message 208 has been sent therefrom. Or, as in the example of FIG. 2, the lookup storage 202 may be used to determine that the last existing message 208 has been sent from the queue 116.

Subsequent messages may then begin to be sent from the target queue in serialized order, using the serialization context (314). For example, the queue scheduler 146 may begin to send the messages 210, 212 from the target queue 124, in serialized order and using the associated serialization context (here, sc1).

Figure 4:
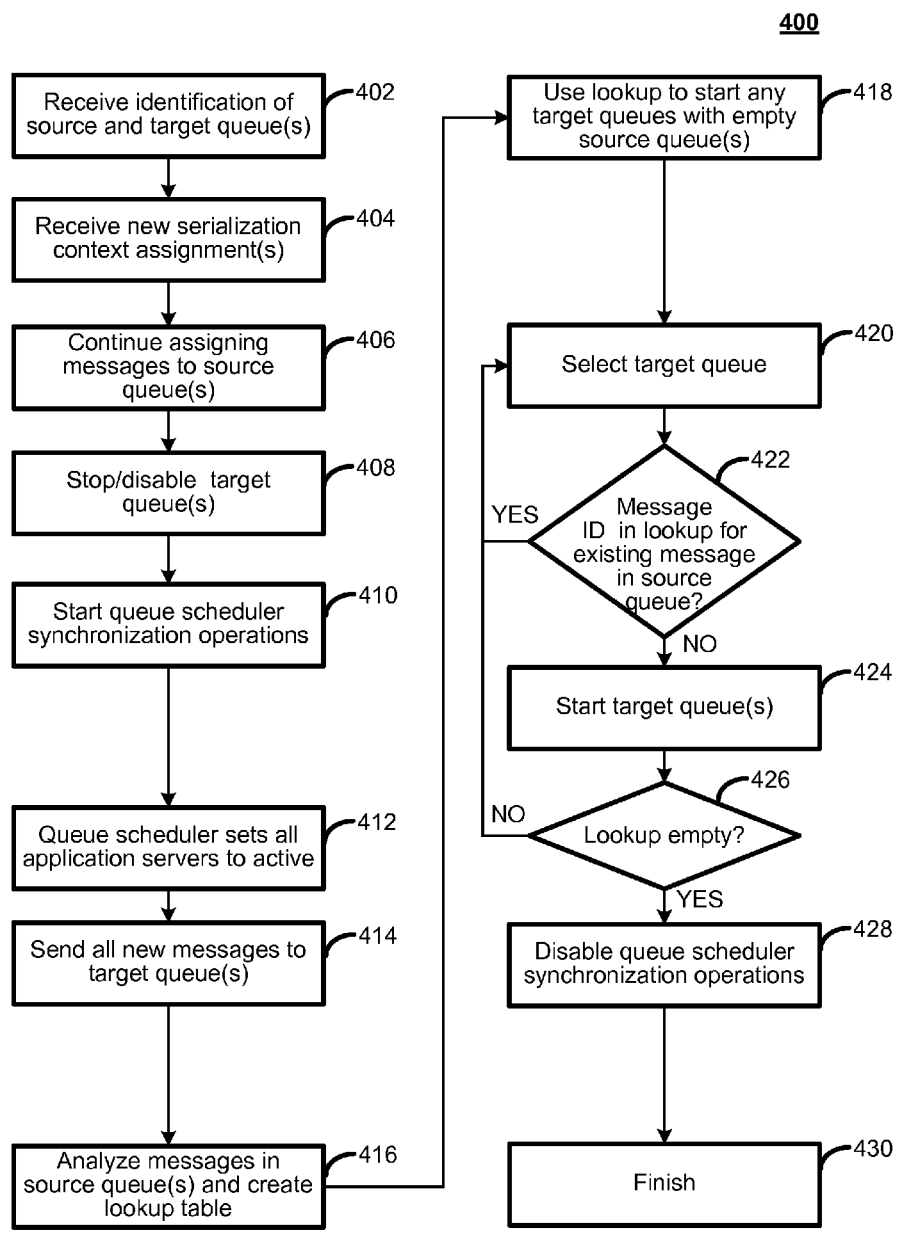
FIG. 4 is a flowchart illustrating further example operations of the system of FIGS. 1 and 2.
Figure 5:
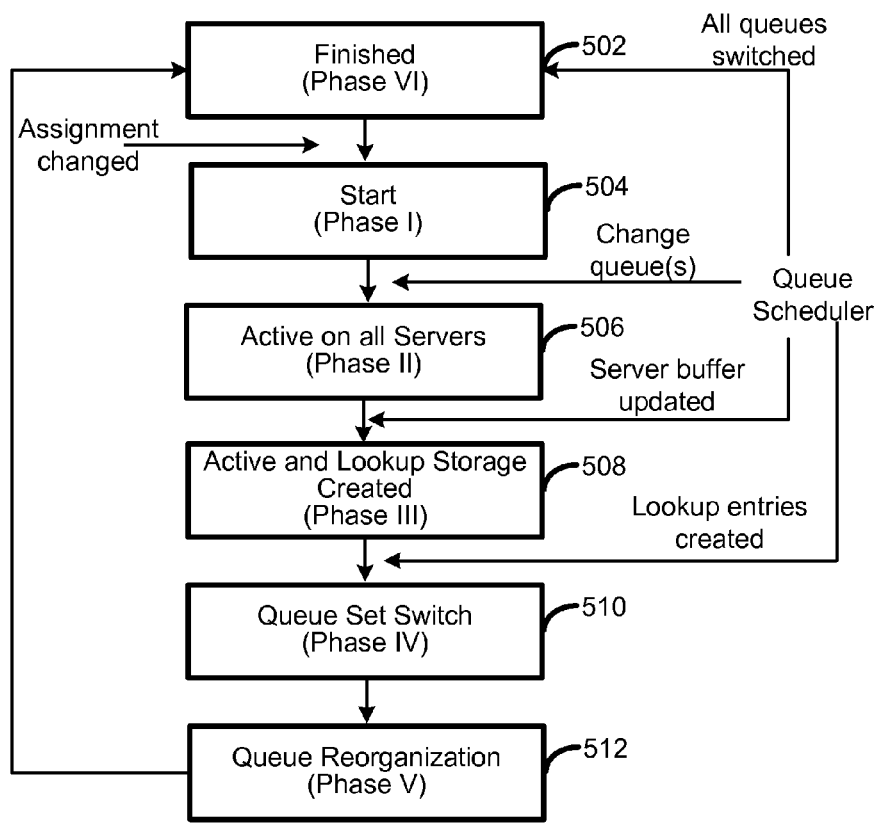
FIG. 5 is a flowchart illustrating a different view of the example operations of the flowchart of FIG. 4.

FIG. 4 is a flowchart 400 illustrating further example operations of the system of FIGS. 1 and 2, and FIG. 5 is a flowchart 500 illustrating process states associated with operations of the flowchart 400 of FIG. 4. In the examples of FIGS. 4 and 5, the change in queue assignment of one or more serialization contexts is executed by the queue manager 122 having at least the functionality already described herein. In the example of FIG. 4, as just referenced, it is assumed that a process state controls which queue serialization context assignment is used for a message that is entering the messaging system 112. These process states are illustrated explicitly in FIG. 5.

Under these assumptions, an initial value of the process state may be considered to be 'Finished' 502. The queue manager 122 (i.e., relevant processes thereof, including processes of the queue scheduler 146) runs periodically or in response to a user request, and, once initiated, performs actions according to the process state.

In FIGS. 4 and 5, then the process state may initially be changed from finished (502) to start (504). As described herein, a user or program may initiate this change, such as when an identification of a source queue(s) and target queue(s) is received (402), such as by way of the queue management interface 130. In the same or separate operation, the actual change in queue assignment may be received or determined (404).

In the Start phase (504), messages are still assigned to the source queue(s) (406), while the target queue(s) are stopped or disabled from receiving messages (408). Synchronization operations of the queue scheduler 146 as described herein may be initiated (410), which completes phase I, the Start phase (504).

The queue scheduler may initiate phase II (506) by setting the state to active on all servers, e.g., setting all application servers (e.g., 120, 126 in FIG. 1) to active (412). For example, in example implementations, if the data is buffered on each application server then the process can only start if the buffers are up to date. As soon as all application servers are able to access this state, all new messages entering the system are located in the (stopped) target queue (414).

Phase III (508) may begin in which the lookup storage 202 is initialized (416), i.e., the queue monitor 148 and/or the queue scheduler 146 may analyze existing/remaining messages in the source queu(s) and create a table or other storage medium to implement the lookup storage 202. As already described, for each source queue the identifier of the last message of a serialization context, the queue name, the serialization context and the related target queue name may be saved.

In phase IV (510), the queue switch, e.g., queue set switch, may occur. Initially, this includes considering any target queues for which corresponding source queues already do not contain messages with the same serialization context (418), i.e., that are empty with respect to messages of the serialization context. For example, in FIGS. 1 and 2, if the source queues 116, 118 did not contain any of the illustrated messages with the relevant serialization contexts sc1, sc2 (e.g., they had already been sent prior to the start of the process), then the target queue 124 may be started immediately. In such cases, the operation may occur in a single transaction of all relevant empty source queues, to minimize a chance that target queues are started that should be blocked from starting. In FIG. 4, the lookup storage 202 may be used to select the relevant target queues, since the lookup storage 202 includes all relevant source queues in association with their relevant serialization contexts, if any.

In Phase V (512), the actual queue reorganization may begin. For example, in FIG. 4, for a plurality of potential target queues, a first target queue may be selected (420). For this target queue (and associated serialization context), it may be determined that the corresponding source queue(s) with the same serialization context either does or does not still contain an existing message (422). If the source queue(s) does still contain an existing message, then a next target queue may be selected and similarly analyzed (420, 422), until a target queue is found with a corresponding source queue(s) that is empty of existing messages with the same serialization context. As is apparent, the determination(s) of status of such existing messages may be made from the lookup storage 202, or by direct inspection of the relevant source queue(s).

Once such a target queue is found with a corresponding source queue(s) that is empty of corresponding messages with the same serialization context, then this target queue may be started (424). For example, if the target queue 124 is the target queue in question, the queue monitor 148 may determine that the source queue 116 and the source queue 118 are empty of existing messages having serialization contexts sc1, sc2, respectively. Then, the target queue 124 may be started to begin transmitting the subsequent messages placed there during the transition period.

If the lookup storage 202 is empty (426), the synchronization operations of the queue scheduler 146 may be stopped (428) and finish (430) wherein the process may move to phase VI (502), finished, as shown in FIG. 5. Otherwise, the process continues until the lookup storage 202 is empty (or all source queues are empty or deleted), signifying that no source queues still exist which share a serialization context with any of the target queues.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system for managing a plurality of related messages generated by an application in a serial order and a serialization context generated by the application for each of the plurality of related messages to ensure that the plurality of related messages are transmitted in the serial order, the computer system comprising:
    at least one processor;
    instructions recorded on a non-transitory computer-readable medium and executable by the at least one processor; and
    the computer system further includes
        a queue assignment handler configured to associate the serialization context of the plurality of related messages with a source queue used to transmit a sequence of the related messages in the serial order based on the serialization context and configured to receive a change in queue assignment of the serialization context from the source queue to a target queue;
        a queue monitor configured to monitor the related messages associated with the source queue and the target queue to assist with maintaining the sequence of the related messages in the serial order;
        a queue scheduler configured to execute the change in queue assignment, including being configured to
            schedule transmission of the related messages to and from the source queue and the target queue so as to maintain the sequence of the related messages in the serial order;
            determine, from the queue assignment handler, the change in queue assignment of the serialization context from the source queue to the target queue;
            suspend transmission of existing messages of the related messages from the source queue and the target queue, and disable a placement of subsequent messages of the related messages into the source queue;
            schedule placement of the subsequent messages of the related messages within the target queue;
            resume transmission of the existing messages of the related messages from the source queue;
            receive, from the queue monitor, notification of completion of the transmission of the existing messages of the related messages from the source queue; and
            after receiving the notification of completion of the transmission of the existing messages of the related messages from the source queue, transmit the subsequent messages of the related messages from the target queue to thereby maintain transmission of the sequence of the related messages in the serial order using the serialization context;

wherein the source queue is included within a plurality of source queues, each having at least one serialization context, and wherein the change in queue assignment includes a consolidation of the serialization contexts of all of the plurality of source queues into association with the target queue;

wherein the queue assignment handler is configured to select the plurality of source queues from among a larger pool of source queues;

wherein the serialization context includes an identifier received from the application that originates the related messages, and that is associated with each of the related messages; and wherein the queue scheduler is configured to execute the change in queue assignment, including being configured to schedule an initial transmission of the related messages from the source queue using the serialization context, prior to the change in queue assignment, and begin transmission of the subsequent messages from the target queue, using the serialization context, subsequent to the notification.

2. The system of claim 1, wherein the queue assignment handler is configured to select the plurality of source queues from among the larger pool of source queues based on an efficiency selection criteria associated with optimizing an increase in efficiency of processing of the related message resulting from the consolidation.

3. The system of claim 2 wherein the efficiency selection criteria is determined based on a delay associated with the change in queue assignment when using the plurality of source queues compared to a corresponding delay associated with using at least one other combination of source queues from the larger pool of source queues.

4. The system of claim 1 comprising:
a view generator configured to generate a queue management user interface providing fields to receive queue designations of the source queue and the target queue from a user; and
a request handler configured to receive the queue designations and forward the queue designations to the queue assignment handler.

5. The system of claim 1 wherein the target queue is created at a time of the change in queue assignment in order to receive the serialization context.

6. The system of claim 1 wherein the queue assignment handler is configured to determine, before executing the change in queue assignment, that a delay associated with the change in queue assignment will be less than a time saved in processing the related messages using the target queue, relative to continued processing of the related messages using the source queue.

7. The system of claim 1 wherein, after disabling of the source queue from receiving the subsequent messages, the queue monitor is configured to create a lookup storage in which at least a last message of the existing messages of the source queue is identified with respect to the serialization context and the target queue, and wherein the queue monitor is configured to monitor the lookup storage to determine the notification of completion of the transmission of the existing messages from the source queue.

8. The system of claim 1, wherein the serialization context is configured to provide a mechanism to maintain transmission of the sequence of the related messages in the serial order from the source queue and the target queue.

9. A computer program product tangibly embodied on a non-transitory computer-readable medium and including executable code that, when executed, is configured to cause a data processing apparatus to:

generate a plurality of related messages in a serial order and generate a serialization context for each of the plurality of related messages to ensure that the plurality of related messages are transmitted in the serial order;

determine a change in assignment of the serialization context from a source queue to a target queue, the serialization context being associated with the plurality of related messages and being used to maintain a sequence of the related messages in the serial order during transmission thereof from the source queue and the target queue;

initiate a transition period in which the serialization context is associated with both the source queue and the target queue, and in which a first subset of the related messages in the serial order are present in the source queue and a second subset of the related messages in the serial order are present in the target queue;

transmit, during the transition period, all of the first subset of related messages until the source queue is empty of the first subset of related messages;

terminate the transition period including associating the serialization context exclusively with the target queue;

transmit the second subset of related messages in the serial order from the target queue to maintain transmission of the sequence of the related messages in the serial order using the serialization context;

wherein the source queue is included within a plurality of source queues, each having at least one serialization context, and wherein the serialization contexts of all of the plurality of the plurality of source queues are associated with the target queue during the transition period and the change in assignment includes a consolidation of the serialization contexts of all of the plurality of source queues into association with the target queue;

wherein the plurality of source queues is selected from among a larger pool of source queues;

wherein the serialization context includes an identifier received from an application that originates the related messages, and that is associated with each of the related messages; and wherein the change in assignment includes
scheduling an initial transmission of the related messages from the source queue using the serialization context, prior to the change in assignment, and
beginning transmission of the second subset of the related messages from the target queue, using the serialization context, subsequent to a notification of completion of the transmission of the first subset of the related messages from the source queue.

10. The computer program product of claim 9 wherein the executable code, when executed, causes the data processing apparatus to:

generate a queue management user interface providing fields to receive queue designations of the source queue and the target queue from a user; and receive the change in assignment of a serialization context, including identification of the source queue and the target queue, from the queue designations received via the fields.

11. The computer program product of claim 9 wherein the executable code, when executed, causes the data processing apparatus to:
monitor transmission of the first subset of related messages during the transition period, to determine that the source queue is empty of the first subset of related messages.

12. The computer program product of claim 9 wherein the executable code, when executed, causes the data processing apparatus to:
create a lookup storage in which at least a last message of the first subset of related messages of the source queue is identified with respect to the serialization context and the target queue; and
use the lookup storage to determine that all of the first subset of related messages have been transmitted so that the source queue is empty of the first subset of related messages.

13. A method comprising:
generating, by at least one processor, a plurality of first related messages in a serialized order and generating a first serialization context for each of the plurality of first related messages to ensure that the plurality of first related messages are transmitted in the serialized order;
providing, by the at least one processor, the plurality of first related messages in a sequence to a first source queue in the serialized order, each first related message associated with the first serialization context;
buffering, by the at least one processor, the first related messages in the first source queue until a transmission time is reached, in turn, for each buffered message of the first related messages;
sending, by the at least one processor, transmission-ready messages of the first related messages from the first source queue in the sequence according to the serialized order, using the first serialization context, while continuing to store existing messages of the first related messages that are not yet transmission-ready;
changing, by the at least one processor, a queue assignment of the first serialization context to a target queue;
providing, by the at least one processor, subsequent messages of the first related messages with the serialization context to the target queue for buffering therein, while continuing to send remaining transmission-ready messages of the first related messages from the first source queue;
determining, by the at least one processor, that all of the existing messages from the first source queue associated with the serialization context have been sent;
after determining that all of the existing messages from the first source queue associated with the serialization context have been sent, sending, by the at least one processor, the subsequent messages from the target queue according to the sequence in serialized order, using the serialization context;
wherein the first source queue is included within a plurality of source queues, each having at least one serialization context, and wherein changing the queue assignment includes a consolidation of the serialization contexts of all of the plurality of source queues into association with the target queue;
wherein the plurality of source queues is selected from among a larger pool of source queues;
wherein the first serialization context includes a first identifier received from an application that originates the first related messages, and that is associated with each of the first related messages; and changing the queue assignment includes
scheduling, by the at least one processor, an initial transmission of the first related messages from the source queue using the serialization context, prior to changing the queue assignment, and
beginning, by the at least one processor, transmission of the subsequent messages from the target queue, using the serialization context, subsequent to a notification of completion of the transmission of the first related messages from the source queue.

14. The method of claim 13 comprising:
generating a plurality of second related messages in a serialized order and generating a second serialization context for each of the plurality of second related messages to ensure that the plurality of second related messages are transmitted in the serial order;
providing the plurality of second related messages to a second source queue in the serialized order, each second related message associated with the second serialization context;
buffering the second related messages in the second source queue until a transmission time is reached, in turn, for each;
sending transmission-ready second messages of the second related messages from the second source queue according to the serialized order, using the second serialization context, while continuing to store remaining second messages of the second related messages that are not yet transmission- ready;
changing a second queue assignment of the second serialization context to the target queue, in association with the changing of the queue assignment of the first serialization context to the target queue;
providing subsequent second messages of the second related messages with the second serialization context to the target queue for buffering therein, while continuing to send the remaining second messages of the transmission-ready second messages from the second source queue;
determining that all of the related second messages from the second source queue associated with the second serialization context have been sent; and
sending the subsequent second messages from the target queue in serialized order, using the second serialization context.

15. The method of claim 14 wherein the first source queue and the second source queue are among a plurality of source queues, the first and second source queues associated with the first and second serialization contexts, respectively, and associated with the first and second related messages, respectively, wherein the first and second serialization contexts are consolidated with respect to the target queue to increase an efficiency of processing of the associated first and second related messages.

16. The method of claim 13 wherein determining that all of the first related messages from the first source queue associated with the first serialization context have been sent comprises:
creating a lookup storage in which at least a last message of the existing messages of the first source queue is identified with respect to the first serialization context and the target queue; and
using the lookup storage to determine that all of the existing messages of the first source queue have been transmitted so that the first source queue is empty thereof.

* * * * *